INVENTOR
Philip N. Baron

United States Patent Office 3,492,068
Patented Jan. 27, 1970

3,492,068
MOTION PICTURE SOUND SYSTEM
Philip N. Baron, Chicago, Ill., assignor to Philip N. Baron and George H. Gerstman, doing business as Electronic Development Co., Northbrook, Ill., a joint venture
Filed Aug. 12, 1968, Ser. No. 752,068
Int. Cl. G03b 31/00, 31/02; G11b 5/00
U.S. Cl. 352—12                                    10 Claims

ABSTRACT OF THE DISCLOSURE

A system for synchronizing a motion picture projector with a stereo tape recorder. In an illustrative embodiment, an inductor device is positioned within a spring-driven motion picture camera body adjacent a rotatable toothed gear, in inductive relationship therewith. The alternating signal induced in the inductor device by the rotating gear is transmitted and recorded on a first recording track of the stereo tape recorder, while a microphone is coupled to the second recording track of the stereo tape recorder. The signal induced in the inductor device and recorded on the first track is resolved, amplified and utilized to drive a synchronous motor which drives a motion picture projector.

---

This invention relates to a motion picture sound system, and more particularly, a system for synchronizing a motion picture projector with a stereo tape recorder.

Prior art motion picture-tape recorder synchronizing systems generally require the addition of a synchronizing generator to the motion picture camera for producing pulses which are recorded on the tape. A governor-controlled motor is required to drive the generator and the motion picture camera, and it is necessary for the photographer to carry a battery pack for supplying current to the motor.

In some systems, a synchronous motor is used to drive the motion picture camera. The motor is connected to a suitable supply of alternating current, and the pulses are produced by the alternating current and are equal in frequency thereto. The speed of the synchronous motor, i.e., the camera speed, is proportional to the frequency of the alternating current.

The above-mentioned pulse generator systems are useful only with motion picture cameras that are driven by means of an electrical motor.

The present invention obviates the need for an electrical motor drive and is well adapted for use with spring-driven cameras. It allows the photographer greater freedom in that he need only carry his camera and a portable stereo tape recorder with him during filming. No load is imposed on the camera drive mechanism, as with the prior art systems. Additionally, substantially all motion picture cameras (8 mm., 16 mm., 35 mm., and "Super 8") can be easily and inexpensively modified to become "sound cameras" utilizable with the synchronizing system described herein.

In accordance with the illustrative embodiments of the present invention, a camera is provided for use in a motion picture sound system, which camera has within its body, as part of its drive system, a movable member carrying a number of evenly spaced magnetic projections. As used in the specification and claims, the term "magnetic" is defined as material that can be attracted by a magnet. Such material may or may not be in magnetized condition. An inductor device including a pole piece and an induction coil surrounding a portion of the pole piece is immovably positioned within the camera body with the pole piece located adjacent the projections in inductive relationship therewith.

In an illustrative embodiment of the invention, the movable member is a toothed gear and the projections are the teeth of the gear. The pole piece is magnetic and has a generally cylindrical shape with a bevelled tip extending in a direction towards the center of the gear. The inductor device is coupled to an electrical connector which is attached to the camera body for exterior accessibility.

The sound system of the illustrative embodiment of the present invention includes a stereo tape recorder having two recording channels, and means for coupling the inductor device to one of the recording channels. Means are provided for coupling a microphone to the other of the recording channels and means are provided for coupling the output of the one recording channel to a motor drive amplifier which amplifies the signal. The output of the other recording channel is coupled to a speaker. The amplified signal from the motor drive amplifier is transmitted to a synchronous motor which drives the motion picture projector. The projector is driven at a speed proportional to the frequency of the signal output of the one recording channel.

A more detailed explanation of the invention is provided in the following description and claims, and is illustrated in the accompanying drawing, in which:

Figure 1:
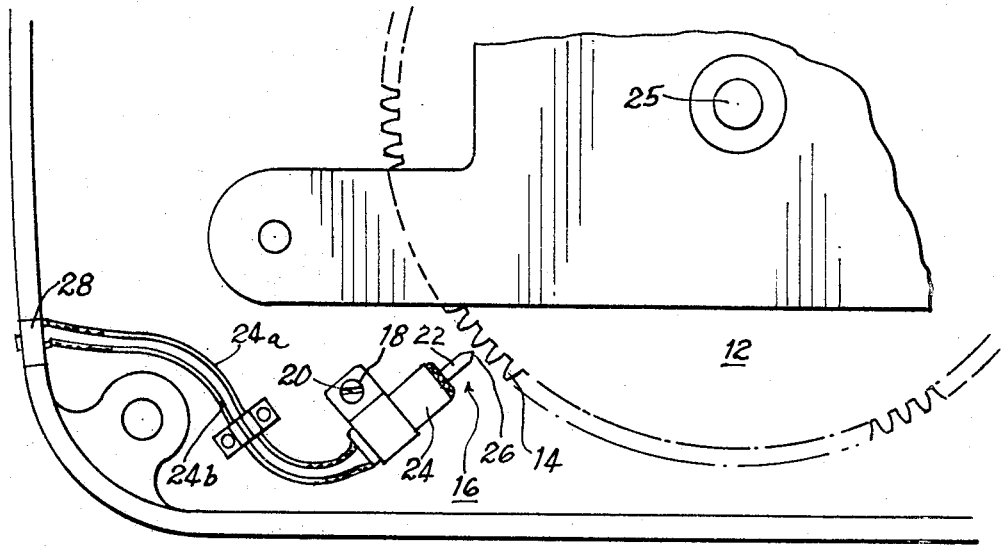
FIGURE 1 is a fragmentary view of a section of a motion picture camera with an inductor device positioned therein in accordance with the principles of the present invention.

Referring to FIGURE 1, there is shown a motion picture camera body 10 having a rotatable gear 12 with teeth 14 thereon. The gear 12 is one of the conventional steel gears which rotates during filming. In a specific example, the camera chosen was a Kodak K-100 camera with a spring drive. It is to be understood, however, that a camera driven by an electrical motor may be effectively used.

In the embodiment of FIGURE 1, the gear 12 is the steel spring supply gear at the rear of the camera. The spring supply gear of the Kodak K-100 camera has 120 teeth and makes one revolution for every 24 frames exposed. As will be explained in more detail below, this gear was selected to provide a recorded 120 hertz signal.

An inductor device 16 is affixed to the camera body by means of a clamp 18 and screw 20. The inductor device comprises a pole piece 22 which is magnetized in its longitudinal direction and a winding 24 which surrounds a portion of the pole piece 22.

Figure 2:
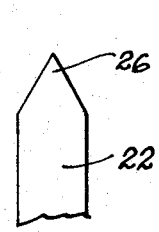
FIGURE 2 is a greatly enlarged, fragmentary front elevation of the pole piece of the inductor device of FIGURE 1.
Figure 3:
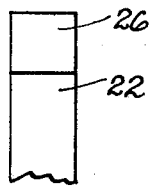
FIGURE 3 is a greatly enlarged, fragmentary side elevation of the pole piece of the inductor device of FIGURE 1.

Pole piece 22 is elongated and has a bevelled tip 26, as shown most clearly in FIGURES 2 and 3. As illustrated in FIGURE 1, the pole piece extends towards the center 25 of the gear 12. The tip 26 of the magnetized pole piece 22 is spaced only a short distance from the teeth 14 of gear 12, so that it is in inductive relationship with the teeth 14. When the gear 12 rotates, a signal is induced in the coil. If 120 teeth of gear 12 pass the tip 26 in one second, an 120 hertz signal is induced. The coil ends 24a and 24b are affixed to an electrical connector 28 which is fastened to the camera body for exterior accessibility. Line 24a is grounded to the camera body while line 24b is connected to a central conductor, and insulated from the camera body.

Although it is preferred that a magnetized pole piece 22 be utilized, the pole piece 22 may be formed of a non-magnetized metallic material and the gear 12 may be magnetized. For example, each of the teeth 14 could be alternatively magnetized with respect to the adjacent teeth. In other words, one tooth would have a north polarity and its immediately adjacent teeth would have south polarities. The resulting induced signal would be essentially the same as the signal induced if the pole piece were magnetized and the gear 12 were formed of a non-magnetized metal.

Figure 4:
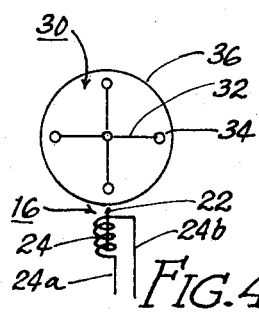
FIGURE 4 is a schematic diagram of an inductor device positioned adjacent a speed governor, in accordance with another embodiment of the invention.

In another embodiment, as shown schematically in FIGURE 4, the inductor device 16 is positioned adjacent the speed governor 30 of the motion picture camera 10. The governor 30 is a conventional speed governor having four arms 32 each with a ferrous ball 34 at its end. A brass ring 36 surrounds the arms and associated balls. Since the brass ring 36 is non-magnetic, the inductor device 16 is positioned on the side of the brass ring opposite the side on which the arms and balls are located. The pole piece 22 is elongated and is magnetized in its longitudinal direction. It is placed in inductive relationship with the speed governor 30 so that rotation of the arms 32 will induce a signal in the winding 24 of the inductor device in a similar manner to the induced signal with respect to the FIGURE 1 embodiment of the present invention.

As a modification of the FIGURE 4 embodiment, the pole piece 22 could be formed of a non-magnetized metal and each of the balls 34 could be magnetized. In this manner, rotation of the arms 32 will cause a signal to be induced in the coil 24 in like manner to the signal induced in the coil when a magnetized pole piece and non-magnetized balls 34 are used. If the governor 30 rotates 30 times per second, a 120 hertz signal will be induced in the winding 24.

Figure 5:
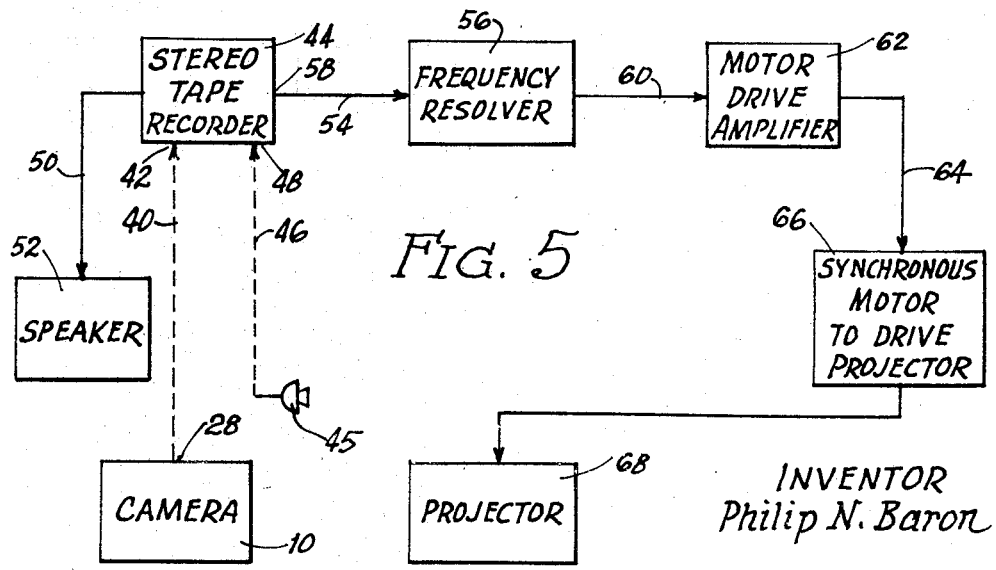
FIGURE 5 is a schematic block diagram of a motion picture sound system in accordance with the principles of the present invention.

Referring to FIGURE 5, a line 40 is connected from electrical connector 28 to input 42 of a conventional stereo tape recorder. The input 42 is coupled through an amplifier to a first recording head (not shown) of the stereo tape recorder 44.

A microphone 45 is coupled via line 46 to a second input 48 of the stereo tape recorder 44. Input 48 is coupled through an amplifier to the second recording head of the recorder for recording voice (and/or other sounds) on a second track.

The signal which is induced in the winding of the inductor is used to record pulses on the first track of the stereo tape recorder while the voice and/or other sound is recorded on the second track. As will be described below, the pulses recorded on the first track are resolved, amplified and used to drive a synchronous motor which drives the motion picture projector at a speed that is proportional to the frequency of the pulses.

During projection of the motion picture, the output of the second track is fed via line 50 to a conventional speaker 52. The output of the first track (on which the induced pulses are recorded) is fed via line 54 to a conventional frequency resolver 56. The output 58 of the first track is shunted by a capacitor (not shown) to limit the frequency response so that the higher frequency gear noises generated within the camera are filtered out. In this manner, a substantially clear signal is fed via line 54 to the frequency resolver 56.

In the illustrative embodiment of the invention, it is preferred that the frequency of the pulses to the synchronous motor is in the vicinity of 60 hertz. Because motion picture cameras are generally not driven at a constant speed, the pulses may vary between about 55 hertz and 65 hertz.

As stated above, in the specific illustrated embodiment, gear 12 has 120 teeth and the gear rotates at approximately one revolution per second. Therefore, in order to obtain an approximate 60 hertz signal, the frequency resolver 56 comprises conventional means for dividing the pulse output on line 54 by two. As specific example, a two transistor flip-flop is used to divide the approximately 120 hertz signal. Since the approximately 120 hertz signal will be divided between the two transistors, the 60 hertz wave appearing at each transistor can be taken from either collector and transmitted via line 60 to a conventional motor drive amplifier 62. The approximately 60 hertz signal is amplified by amplifier 62 and fed via line 64 to a conventional synchronous motor 66 which operates in the vicinity of 60 hertz to drive a conventional motion picture projector 68.

The synchronous motor 66 will drive the projector 68 at a speed that is proportional to the frequency of the pulses transmitted via line 64 to the synchronous motor.

It is seen that a system has been provided in which substantially any motion picture camera can be very simply converted to a camera adapted for tape recorder-motion picture sound synchronization. No external bulky members need to be attached to the motion picture camera and there is no need for an electrical motor driven, synchronous generator to be coupled to the motion picture camera.

Although preferred embodiments have been shown and described, it is to be understood that various modifications and substitutions may be made by those skilled in the art without departing from the spirit and scope of the present invention. For example, the pole piece can take various shapes and positions. No limitation is intended with respect to sizes of parts or materials utilized, other than as defined by the following claims.

What is claimed is:

1. A motion picture sound synchronizing system for use with a camera having within the camera body, as part of its drive system, a movable member carrying a projection comprising magnetically permeable material capable of inducing a pulsating signal, which comprises: an inductor device including a pole piece and an induction coil surrounding a portion of said pole piece; means for positioning said inductor device within said camera body with said pole piece located adjacent said projection in inductive relationship therewith whereby a pulsating signal is induced during movement of said movable member; sound recording means having two recording channels; means for coupling said inductor device to one of said recording channels; and means for coupling a microphone to the other of said recording channels.

2. A motion picture sound system as described in claim 1, wherein said movable member carries a number of evenly spaced projections.

3. A system for synchronizing a motion picture camera with sound recording means having two recording channels, which comprises: a motion picture camera having within its body, as part of its drive system, a movable member carrying a projection comprising magnetically permeable material capable of inducing a pulsating signal; an inductor device including a pole piece and an induction coil surrounding a portion of said pole piece; means for positioning said inductor device within said camera body with said pole piece located adjacent said projection in inductive relationship therewith whereby a pulsating signal is induced during movement of said movable member; an electrical connector affixed to said motion picture camera body for exterior accessibility, said electrical connector having means enabling its coupling to one of said recording channels of said sound recording means while a microphone is coupled to the other of said recording channels; and means electrically connecting said inductor device to said electrical connector, whereby movement of said member will cause a pulsating signal to be induced in said induction coil and transmitted to said electrical connector.

4. A camera for use in a motion picture sound system as described in claim 3, wherein said movable member carries a number of evenly spaced projections.

5. A camera for use in a motion picture sound system as described in claim 4, wherein said pole piece comprises magnetized material.

6. A camera for use in a motion picture sound system as described in claim 4, wherein said projections are magnetized.

7. A camera for use in a motion picture sound system as described in claim 4, wherein said member is a rotatable toothed gear and said projections are the teeth of said gear .

8. A camera for use in a motion picture sound system as described in claim 4, wherein said member is a speed governor.

9. A motion picture sound synchronizing system for use with a camera having within the camera body, as part of its drive system, a movable member carrying a projection comprising magnetically permeable material capable of inducing a pulsating signal, which comprises: an inductor device including a pole piece and an induction coil surrounding a portion of said pole piece; means for positioning said inductor device within said camera body with said pole piece located adjacent said projection in inductive relationship therewith whereby a pulsating signal is induced during movement of said movable member; a tape recorder having two recording channels; means for coupling said inductor device to one of said recording channels, means for coupling a microphone to the other of said recording channels; means for coupling the output of said other recording channel to a speaker; a motion picture projector; a synchronous motor for driving said motion picture projector; and means for coupling the output of said one recording channel to said synchronous motor, whereby said projector is driven at a speed proportional to the pulse output of said one recording channel.

10. A system for synchronizing a motion picture camera with sound recording means having two recording channels, which comprises: a motion picture camera having within its body, as part of its drive system, a movable member carrying a projection comprising magnetically permeable material capable of inducing a pulsating signal; an inductor device including a pole piece and an induction coil surrounding a portion of said pole piece; means for positioning said inductor device within said camera body with said pole piece located adjacent said projection in inductive relationship therewith whereby a pulsating signal is induced during movement of said movable member; an electrical connector affixed to said motion picture camera body with a first portion of said electrical connector facing the inside of said camera body and a second portion of said electrical connector facing the outside of said camera body to permit coupling of said second portion to one of said recording channels of said sound recording means while a microphone is coupled to the other of said recording channels; and means electrically connecting said induction coil with said first portion of said electrical connector, whereby movement of said member will cause a pulsating signal to be induced in said induction coil and transmitted to said electrical connector.

References Cited

UNITED STATES PATENTS

| | | | |
|---|---|---|---|
| 1,910,995 | 5/1933 | Leventhal | 352—180 |
| 2,797,611 | 7/1957 | Anthony | 352—17 |
| 2,822,722 | 2/1958 | Kennedy | 352—17 |
| 2,854,526 | 9/1958 | Morgan. | |

OTHER REFERENCES

Popular Photography, March 1959, Vol. 44, No. 3, pages 108–109, Synchro-Sound System.

JULIA E. COINER, Primary Examiner